(12) United States Patent
Saito et al.

(10) Patent No.: US 7,180,079 B2
(45) Date of Patent: Feb. 20, 2007

(54) RADIATION IMAGE STORAGE PANEL

(75) Inventors: Hiroki Saito, Kaisei-machi (JP); Hideki Suzuki, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 162 days.

(21) Appl. No.: 11/078,387

(22) Filed: Mar. 14, 2005

(65) Prior Publication Data

US 2005/0199826 A1    Sep. 15, 2005

(30) Foreign Application Priority Data

Mar. 12, 2004    (JP) .............................. 2004-070185

(51) Int. Cl.
*H05B 33/00* (2006.01)
(52) U.S. Cl. .................................. 250/484.4
(58) Field of Classification Search .............. 250/484.4
See application file for complete search history.

(56) References Cited

U.S. PATENT DOCUMENTS 5,138,171 A * 8/1992 Tecotzky et al. ......... 250/484.4
6,483,122 B1 * 11/2002 Maezawa et al. ........... 250/582
6,572,986 B2 * 6/2003 Ogawa et al. .............. 428/690
6,713,776 B2   3/2004 Takahashi

FOREIGN PATENT DOCUMENTS

JP    09-269400    10/1997
JP    2000-284097  10/2000

* cited by examiner

*Primary Examiner*—David Porta
*Assistant Examiner*—Mindy Vu
(74) *Attorney, Agent, or Firm*—Sughrue Mion, PLLC

(57) ABSTRACT

A radiation image storage panel has a phosphor layer composed of energy-storing phosphor particles and a polymer binder and satisfies the following conditions;

$$T_1 \times d \geq 660;\ T_2 \times d \geq 660;\ D \geq 3.4$$

[$T_1$ is a transmittance (%) of the phosphor layer at a peak wavelength of a stimulation spectrum of the phosphor particles; $T_2$ is a transmittance (%) of the phosphor layer at a peak wavelength of a stimulated emission spectrum of the phosphor particles; d corresponds to a value of $10,000 \times W/\rho$ [W is a weight of the phosphor particles in a unit area of the phosphor layer expressed by $mg/cm^2$ and $\rho$ is a density of the energy-storing phosphor expressed by $g/cm^3$]; and D is a density of the energy-storing phosphor particles contained in the phosphor layer expressed by $g/cm^3$].

8 Claims, 2 Drawing Sheets

RADIATION IMAGE STORAGE PANEL

FIELD OF THE INVENTION

The present invention relates to a radiation image storage panel employable in a radiation image recording and reproducing method in which an energy-storing phosphor is utilized.

BACKGROUND OF THE INVENTION

When exposed to radiation such as X-rays, an energy-storing phosphor (e.g., stimulable phosphor, which gives stimulated emission off) absorbs and stores a portion of the radiation energy. The phosphor then emits stimulated emission according to the level of the stored energy when it is exposed to a stimulating light. A radiation image recording and reproducing method utilizing the energy-storing phosphor has been widely employed in practice. In this method, a radiation image storage panel, which is a sheet comprising the energy-storing phosphor, is used. The method comprises the steps of: exposing the storage panel to radiation having passed through an object or having radiated from an object, so that radiation image information of the object is temporarily recorded in the storage panel; sequentially scanning the storage panel with a stimulating light such as a laser beam to produce stimulated emission; and photoelectrically detecting the emission to obtain electric image signals. The storage panel thus treated is subjected to a step for erasing radiation energy remaining therein, and then stored for the use in the next recording and reproducing procedure. Thus, the radiation image storage panel is repeatedly employable.

The radiation image storage panel (often referred to as energy-storing phosphor sheet) has a basic structure comprising a support and an energy-storing phosphor layer provided thereon. If the phosphor layer is self-supporting, however, the support may be omitted. Further, a protective layer is generally provided on the free surface (surface not facing the support) of the phosphor layer to keep the phosphor layer from chemical deterioration and physical damage.

The phosphor layer generally comprises a binder and an energy-storing phosphor dispersed therein.

Since the radiation image recording and reproducing method has various advantages as described above, it is desired that the radiation image storage panel used in the method have a sensitivity as high as possible and give a reproduced radiation image of high quality (particularly in regard to sharpness and graininess).

Japanese Patent Provisional Publication 2000-284097 describes use of a radiation image storage panel employing tetradecahedral particles of stimulable rare earth metal-activated alkaline earth metal halide phosphor in which the particles have a mean particle size ($D_m$) in the range of 3.5 to 7.5 μm, a particle size distribution (Q) in the range of 0.500 to 0.800 so as to improve the image quality such as graininess. It is also described that the density of the phosphor particles in the phosphor layer can be increased by the use of phosphor particles comprising a mixture of phosphor particles having a particle size of 5.0 to 8.0 μm and phosphor particles having a particle size of 2.0 to 4.0 μ. Nevertheless, a density of the phosphor particles in the phosphor layer is increased up to a range of 3.12 to 3.32 g/cm$^3$ according to working examples described in the Provisional Publication.

Japanese Patent Provisional Publication 9-269400 describes that the sensitivity and image quality can be improved by the use of a radiation image storage panel which has a phosphor layer containing 65% or more of phosphor particles. The phosphor particles comprise particles A having a size distribution peak in the range of 0.5 to 5 μm and particles B having a size distribution peak in the range of 6 to 30 μm in a ratio of 5:95 to 40:60. The size distribution peak of the particles B is larger than the size distribution peak of the particles A by 5 μm, or the former peak is as much as 3 times or more the latter peak.

Thus, it is known that the use of a mixture of plural groups of phosphor particles having different size distribution increases the density of phosphor particles in the phosphor layer and hence improves the image quality (such as graininess) of the resulting radiation image.

SUMMARY OF THE INVENTION

The present inventors have studied for the purpose of providing a radiation image storage panel that reproduces a radiation image having more improved image quality and found that the desired more improvement of the image quality can be attained by further increasing a density of phosphor particles in the phosphor layer and increasing a transmittance of the phosphor layer for each of the stimulating light and stimulated emission. The increased transmittance for the stimulating light is important for efficiently stimulating phosphor particles located in the bottom portion of the phosphor layer. The increased transmittance for the stimulated emission is important for efficiently releasing the stimulated emission from the phosphor layer.

The inventors have further studied for investigating an advantageous relationship between the density of the phosphor particles in the phosphor layer and the transmittances of the phosphor layer for both of the stimulating light and stimulated emission. As a result, the inventors have succeeded in establishing the advantageous relationship.

Accordingly, the present invention resides in a radiation image storage panel which comprises a phosphor layer comprising energy-storing phosphor particles and a polymer binder and which satisfies the following conditions:

$$T_1 \times d \geq 660$$

$$T_2 \times d \geq 660$$

$$D \geq 3.4$$

wherein each of $T_1$, $T_2$, d and D has the following meaning:

$T_1$: a transmittance in terms of percentage of the phosphor layer at a peak wavelength of a stimulation spectrum of the energy-storing phosphor particles;

$T_2$: a transmittance in terms of percentage of the phosphor layer at a peak wavelength of a stimulated emission spectrum of the energy-storing phosphor particles;

$d = 10{,}000 \times W/\rho$ in which W is a weight of the energy-storing phosphor particles in a unit area of the phosphor layer expressed in terms of mg/cm$^2$ and $\rho$ is a density of the energy-storing phosphor expressed in terms of g/cm$^3$; and D is a density of the energy-storing phosphor particles contained in the phosphor layer expressed in terms of g/cm$^3$.

In the invention, it is preferred that each of the transmittances of $T_1$ and $T_2$ is 1% or higher, and that the radiation image storage panel further comprises a light-reflecting layer on one side of the phosphor layer, the light-reflecting layer having a reflectance of 70% or higher at a peak wavelength of the stimulated emission spectrum.

It is also preferred that the energy-storing phosphor particles comprises a group of smaller energy-storing phosphor particles having a minimum mean particle diameter $D_{m1}$ in the range of 1.0 to 3.5 μm and a group of larger energy-storing phosphor particles having a maximum mean particle diameter $D_{m2}$, $D_{m2}/D_{m1}$ being 2.0 or larger. A ratio of the smaller phosphor particles and the larger phosphor particles preferably is in the range of 10:90 to 50:50, more preferably 20:80 to 38:62. The mean particle size means a median particle size (i.e., the center value in the particle size distribution).

It is also preferred that a volume percentage of the energy-storing phosphor particles in the phosphor layer is 65% or higher, and more preferably 70% or higher.

DETAILED DESCRIPTION OF THE INVENTION

Figure 1:
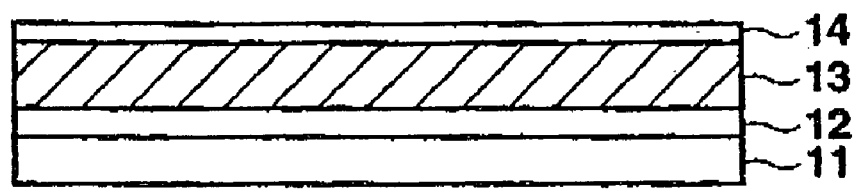
FIG. 1 is a sectional view schematically illustrating a structure of radiation image storage panel.

A typical structure of the radiation image storage panel of the invention is illustrated in FIG. 1. In FIG. 1, the radiation image storage panel comprises support 11, light-reflecting layer 12, phosphor layer 13, and protective layer 14.

The phosphor layer comprises energy-storing phosphor particles and a polymer binder and should satisfy the conditions of:

$T_1 \times d \geq 660$ $T_2 \times d \geq 660$ $D \geq 3.4$ in which the meanings of $T_1$, $T_2$, d and D are described hereinbefore.

The density (D) of the phosphor particles in the phosphor layer can be obtained by measuring the weight and volume (area×height) of the phosphor layer and a ratio by weight of the phosphor particles and polymer binder.

The phosphor layer of the radiation image storage panel of the invention can be prepared by employing a mixture of two or more groups of phosphor particles having different mean particle sizes. It is preferred that a group having the largest phosphor particles is contained in the phosphor layer in an amount of twice or more the amount of a group having the smallest phosphor particles.

In the following description, the radiation image storage panel of the invention is explained in more detail.

The support generally is a soft resin sheet or film having a thickness of 50 μm to 1 mm. The support may be transparent, may contain light-reflecting material (e.g., particles of alumina, titanium dioxide and barium sulfate) or voids for reflecting the stimulating light or the emission, or may contain light-absorbing material (carbon black) for absorbing the stimulating light or the emission. Examples of the resin materials employable for the support include polyethylene terephthalate, polyethylene naphthalate, aramide resin and polyimide resin. For improving the sharpness of the resultant image, fine concaves and convexes may be formed on the phosphor layer-side surface of the support (or on the phosphor layer-side surface of an auxiliary layer such as a subbing layer, a light-reflecting layer, or a light-absorbing layer, if it is provided). The support may be a sheet of metal, ceramics, or glass, if desired.

On the support, a light-reflecting layer can be placed, optionally, via an adhesive layer. Generally, the light-reflecting layer comprises particles of light-reflecting material, a binder dispersing and supporting the particles, and a surface-treatment agent.

The light-reflecting layer preferably scatters a stimulating light under such condition that the scattering length can be preferably 5 μm or less, more preferably 4 μm or less. The "scattering length" means an average distance in which a stimulating light travels until it is scattered, and hence a short scattering length indicates that the stimulating light is highly scattered.

The scattering length can be calculated according to the Kubeluka-Munk equation.

Examples of the light-reflecting materials include white pigments such as $Al_2O_3$, $ZrO_2$, $TiO_2$, MgO, $BaSO_4$, $SiO_2$, ZnS, ZnO, $CaCO_3$, $Sb_2O_3$, $Nb_2O_5$, $2PbCO_3 \cdot Pb(OH)_2$, $PbF_2$, $BiF_3$, $Y_2O_3$, YOCl, $M^{II}FX$ (in which $M^{II}$ is at least one selected from the group consisting of Ba, Sr and Ca; and X is at least one selected from the group consisting of Cl and Br), lithopone ($BaSO_4$, and ZnS), magnesium silicate, basic lead silicate sulfate, basic lead phosphate, and aluminum silicate; and hollow polymer. They may be used singly or in combination. Particularly preferred are $Al_2O_3$, $Y_2O_3$, $ZrO_2$ and $TiO_2$, which have such a high refractive index that the scattering length of the reflecting layer can be easily made 5 μm or shorter.

In order to prepare the light-reflecting layer giving the short scattering length, the particles of light-reflecting material may be made to have a diameter as close as possible to the wavelength of the stimulating light and/or made to have not a spherical shape but a deformed one. In detail, the mean size of the particles preferably is ¼ to 2 times as large as the stimulating wavelength. In other words, the mean size of the particles preferably is in the range of 0.1 to 2.0 μm because the stimulating light is generally in the wavelength range of 500 to 800 nm.

The BET specific surface area (surface area per unit mass) of the light-reflecting material generally is 1.5 m²/g or more, preferably in the range of 2 to 10 m²/g, more preferably in the range of 2.5 to 8 m²/g. The bulk density (closest packing density) of the reflecting material preferably is 1 mg/cm³ or less, more preferably 0.6 mg/cm³ or less. The bulk density (closest packing density) can be determined by the steps of weighing a powder of the light-reflecting material, shaking the powder to fill voids therein so that the powder may be packed closest, measuring the volume of the closest packed powder, and calculating a ratio of the weight to the volume.

On the light-reflecting layer, a phosphor layer comprising energy-storing phosphor is provided. The energy-storing phosphor preferably is a stimulable phosphor giving stimulated emission off in the wavelength region of 300 to 500 nm when it is exposed to a stimulating light in the wavelength region of 400 to 900 nm. Preferred examples of the stimulable phosphors include europium or cerium activated alka line earth metal halide stimulable phosphors [e.g., BaFBr:Eu and BaF(Br, I):Eu] and cerium activated rare earth oxyhalide phosphors.

Particularly preferred is a rare earth activated alkaline earth metal fluoride halide stimulable phosphor represented by the formula (I):

$$M^{II}FX:zLn \qquad (I)$$

in which $M^{II}$ is at least one alkaline earth metal selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0<z\leq 0.2$.

In the formula (I), $M^{II}$ preferably comprises Ba more than half of the total amount of $M^{II}$, and Ln is preferably Eu or Ce. The $M^{II}FX$ in the formula (I) represents a matrix crystal structure of BaFX type, and it by no means indicates stoichiometrical composition of the phosphor. Accordingly, a molar ratio of F:X is not always 1:1. It is generally preferred that the BaFX type crystal have many $F^+$ ($X^-$) centers corresponding to vacant lattice points of $X^-$ ions since they increase the efficiency of stimulated emission in the wavelength region of 600 to 700 nm. In that case, F is often slightly in excess of X.

Although omitted from the formula (I), one or more additives such as bA, $wN^I$, $xN^{II}$ and $yN^{III}$ may be incorporated into the phosphor of the formula (I), if needed. In the above, A stands for a metal oxide such as $Al_2O_3$, $SiO_2$ or $ZrO_2$. In order to prevent $M^{II}FX$ particles from sintering, the metal oxide preferably has low reactivity with $M^{II}FX$ and the primary particles of the oxide are preferably super-fine particles of 0.1 μm or less diameter. In the above-mentioned description, $N^I$ is a compound of at least one alkali metal selected from the group consisting of Li, Na, K, Rb and Cs; $N^{II}$ is a compound of alkaline earth metal(s) Mg and/or Be; and $N^{III}$ is a compound of at least one trivalent metal selected from the group consisting of Al, Ga, In, Tl, Sc, Y, La, Gd and Lu. The metal compounds are preferably halides.

In the above-mentioned description, b, w, x and y represent amounts of the additives incorporated into the starting materials, provided that the amount of $M^{II}FX$ is assumed to be 1 mol. They are numbers satisfying the conditions of $0\leq b\leq 0.5$, $0\leq w\leq 2$, $0\leq x\leq 0.3$ and $0\leq y\leq 0.3$, respectively. These numbers by no means represent the contents in the resultant phosphor because the additives often decrease during the steps of firing and washing performed thereafter. Some additives remain in the resultant phosphor as they are added to the starting materials, but the others react with $M^{II}FX$ or are involved in the matrix.

In addition, the phosphor of the formula (I) may further comprise Zn and Cd compounds; metal oxides such as $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$ and $ThO_2$; Zr and Sc compounds; B compounds; As and Si compounds; tetrafluoroborate compounds; hexafluoro compounds such as monovalent or divalent salts of hexa-fluorosilicic acid, hexafluorotitanic acid and hexa-fluorozirconic acid; or compounds of transition metals such as V, Cr, Mn, Fe, Co and Ni. The phosphor employable in the invention is not restricted to the above, and any phosphor that can be essentially regarded as rare earth activated alkaline earth metal fluoride halide stimulable phosphor can be used.

The phosphor employable in the invention is not restricted to the above-described stimulable phosphor represented by the formula (I).

The energy-storing phosphor employable in the invention generally is in the form of particles having an aspect ratio of 0.1 to 5.0, preferably 1.0 to 1.5. In their size distribution, the median diameter (Dm) preferably is in the range of 1 to 10 μm and the σ/Dm (in which σ represents the standard deviation) preferably is 50% or less (more preferably 40% or less). The shape of the particle is rectangular parallelepiped, regular hexahedron, regular octahedron, tetradecahedron, intermediate polyhedron thereof, or irregular shape. Preferred is tetradecahedron.

As described hereinbefore, the phosphor layer of the radiation image storage panel according to the invention preferably comprises a group of smaller (or smallest) energy-storing phosphor particles having a minimum mean particle diameter $D_{m1}$ in the range of 1.0 to 3.5 μm and a group of larger (or largest) energy-storing phosphor particles having a maximum mean particle diameter $D_{m2}$. A ratio of $D_{m2}/D_{m1}$ preferably is 2.0 or larger. The phosphor layer preferably contains the group of smaller phosphor particles and the group of larger phosphor particles in a ratio by weight of 10:90 to 50:50, more preferably 20:80 to 38:62.

The phosphor layer can be formed in the following manner.

First, the phosphor particles and a binder are dispersed or dissolved in an appropriate organic solvent to prepare a coating solution. The ratio between the binder and the phosphor in the solution generally is in the range of 1:1 to 1:100 (binder:phosphor, by weight), preferably 1:10 to 1:50.

As the binder, various resin materials are generally known. Examples of the binder include natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, linear polyester, and thermoplastic elastomers. These may be cross-linked with a cross-linking agent.

Examples of the solvents employable in preparation of the coating solution for the phosphor layer include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate and butyl acetate; ethers such as dioxane, ethylene glycol monoethyl ether, ethylene glycol monomethyl ether and tetrahydrofuran; and mixtures thereof.

The coating solution may contain various additives such as a dispersing aid to assist the phosphor particles in dispersing, a plasticizer for enhancing the bonding between the binder and the phosphor particles, an anti-yellowing agent for preventing the layer from undesirable coloring, a hardening agent, and a crosslinking agent.

The coating solution is then evenly spread on a surface of the support or light-reflecting layer by coating means, and dried to form the phosphor layer. The thickness of the phosphor layer generally is in the range of 20 μm to 1 mm, preferably in the range of 50 to 500 μm.

Thus formed phosphor layer is preferably compressed by means of, for example, a calender roll. By the compression, the packing density of the energy-storing phosphor layer can be increased to 65 vol. % or more.

The phosphor layer can be a single layer or consist of two or more sub-layers. The sub-layers may have different compositions. For example, they may differ in the phosphor (in regard to the compound or the particle size) or in the ratio between the phosphor and the binder. In other words, the sub-layers can be optimally determined so that the emission characteristics of the phosphor layer may suit the use of the storage panel or that a suitable scattering length may be obtained. Further, it is not necessary to form the phosphor layer directly on the light-reflecting layer or support. For example, the phosphor layer beforehand formed on another substrate (temporary support) may be peeled off and then fixed on the light-reflecting layer or support with an adhesive.

On the phosphor layer, a protective layer is preferably provided to ensure good handling of the storage panel in transportation and to avoid deterioration. The protective layer preferably is transparent so as not to prevent the stimulating light from coming in or not to prevent the emission from coming out. Further, for protecting the storage panel from chemical deterioration and physical damage, the protective layer is preferably chemically stable, physically strong, and of high moisture proof.

The protective layer can be provided by coating the phosphor layer with a solution in which a transparent organic polymer (e.g., cellulose derivatives, polymethyl methacrylate, fluororesins soluble in organic solvents) is dissolved in an appropriate solvent, by placing a beforehand prepared sheet as the protective layer (e.g., a film of organic polymer such as polyethylene terephthalate) on the phosphor layer with an adhesive, or by depositing vapor of inorganic compounds on the phosphor layer. Various additives may be contained in the protective layer. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyiso-cyanate). The thickness of the protective layer generally is in the range of about 0.1 to 20 μm.

For enhancing resistance to stain, a fluororesin layer may be placed on the protective layer. The thickness of the fluororesin layer generally is in the range of 0.5 to 20 μm. For forming the fluororesin layer, additives such as a crosslinking agent, a film-hardening agent and an anti-yellowing agent can be used. In particular, the crosslinking agent is advantageously employed to improve durability of the fluororesin layer.

The storage panel of the invention can be in known various structures. For example, in order to improve the sharpness of the resultant radiation image, at least one of the films or layers may be colored with a colorant which does not absorb the stimulated emission but the stimulating light. Further, a different phosphor layer comprising a phosphor which absorbs radiation and instantly emits ultraviolet or visible light may be provided. Examples of the phosphors include phosphors of $LnTaO_4$: (Nb, Gd) type, $Ln_2SiO_5$:Ce type and LnOX:Tm type (Ln is a rare earth element); CsX (X is a halogen); $Gd_2O_2S$:Tb; $Gd_2O_2S$:Pr,Ce; $ZnWO_4$; $LuAlO_3$:Ce; $Gd_3Ga_5O_{12}$:Cr, Ce; and $HfO_2$.

EXAMPLE 1

| (1) Preparation of phosphor sheet | |
|---|---|
| Two groups of tetradecahedral stimulable phosphor particles ($BaF(Br_{0.85}I_{0.15})$: $Eu^{2+}$, density ρ: 5.2 g/cm³, mean particle sizes and relative amounts (%) are set | 1.000 g |

| -continued | |
|---|---|
| (1) Preparation of phosphor sheet | |
| forth in Table 1) | |
| Binder: polyurethane elastomer [MEK solution (solid content: 13 wt. %) of Pandex T5265H, Dainippon Ink & Chemicals, Inc.] | 182 g |
| Crosslinking agent: polyisocyanate resin [Colonate HX (solid content: 100%), Nippon Polyurethane Co., Ltd.] | 3 g |
| Anti-yellowing agent: epoxy resin [Epikote #1001 (solid), Yuka Shell Epoxy] | 6.7 g |

The above-mentioned materials were mixed in 86 g of methyl ethyl ketone (MEK), and stirred at 10,000 rpm for 30 minutes by means of a propeller mixer to prepare a phosphor dispersion having a viscosity of 3 Pa.s (binder/phosphor: 1/30, by weight). Independently, a polyethylene terephthalate sheet (temporary support, thickness: 190 μm) beforehand coated with a silicone releasing agent was prepared. The phosphor dispersion was then spread on the releasing agent-coated surface of the temporary support by means of a coating machine to give a coated dispersion layer having a width of 300 mm, and dried to form a phosphor layer containing the phosphor in an amount (W) of 93 mg/cm². The phosphor layer was then separated from the support to obtain a phosphor sheet (width: 300 mm).

| (2) Formation of light-reflecting layer | |
|---|---|
| Light-reflecting material: Fine particles of extra-pure alumina [mean size: 0.4 μm, UA-5105, Showa Denko K. K.] | 444 g |
| Binder: Soft acryl resin [Criscoat P-1018GS (20% toluene solution), Dai-nippon Ink & Chemicals, Inc.] | 100 g |
| Colorant: ultramarine [SM-1, Daiichi Chemical Industry Co.,, Ltd.] | 2.2 g |
| Surface-treatment agent: Aluminum coupling agent [Plane-act Al-M, Ajinomoto Inc.] | 2 g |

The above-mentioned materials were mixed in 387 g of MEK, and dispersed to prepare a dispersion having a viscosity of 2 to 3 Pa.s. The dispersion was spread on a polyethylene terephthalate sheet (thickness: 188 μm, haze: approx. 27, Lumilar S-10, available from Toray Company, Ltd.) by means of a coating machine, and dried to form a light-reflecting layer (thickness: approx. 100 μm).

(3) Formation of Phosphor Layer (Compression Under Heating)

The phosphor sheet was placed on the light-reflecting layer so that the bottom face of the phosphor sheet (surface having been in contact with the temporary support when the phosphor sheet was prepared) would be in contact with the light-reflecting layer. Thus formed laminate was then compressed under heating by means of a calender roll (total weight: 2,300 kg, temperature of the upper roll: 45° C., temperature of the lower roll: 45° C., transferring rate: 0.3 m/minute), so that the phosphor sheet was compressed and completely combined with the light-reflecting layer. The thickness of the thus-formed phosphor layer was 250 μm, and the packing density of the phosphor particles contained in the phosphor layer was 3.71 g/cm$^3$ (relative amount of phosphor: 71 vol. %).

| (4) Formation of protective layer | |
|---|---|
| Polymer material: fluoroolefin-vinylether copolymer [Lumiflon LF-504X (30% xylene solution), Asahi Glass Co., Ltd.] | 76 g |
| Crosslinking agent: polyisocyanate [Sumijule N3500 (solid content: 100%), Sumitomo Bayer Urethane, Inc.] | 7.5 g |
| Catalyst: dibutyl tin dilaurate [KS1260, Kyodo Yakuhin Co., Ltd.] | 0.25 mg |

The above-mentioned materials were mixed in 38 g of MEK and dispersed to prepare a polymer solution. The polymer was spread and dried to form a protective layer (thickness: 3 μm) on the phosphor layer.

Thus obtained composite product was cut to give a radiation image storage panel (200 mm×250 mm) comprising a support, a light-reflecting layer, a phosphor layer containing an energy-storing phosphor, and a transparent protective layer.

EXAMPLES 2 and 3

The procedures of Example 1 were repeated except that the amount of the phosphor particles in the phosphor layer and the thickness of the phosphor layer set forth in Table 1 were adopted, to produce a radiation image storage panel.

COMPARISON EXAMPLES 1 and 2

The procedures of Example 1 were repeated except that the phosphor particles having different mean particle sizes, the amount of the phosphor particles in the phosphor layer and the thickness of the phosphor layer set forth in Table 1 were adopted, to produce a radiation image storage panel.

[Evaluation of Radiation Image Storage Panel]

The radiation image storage panels were evaluated in the following manner.

(1) Transmittance of Phosphor Layer and Reflectance of the Light-reflecting Layer The transmittance and reflectance were measured in the below-mentioned manner using an automatic spectrophotometer (U-3210, available from Hitachi Corporation, equipped with an integrating sphere of 150 φ). The wavelength for the measurement was set to correspond to the maximum peak wavelength (400 nm) of stimulated emission of the phosphor employed for the preparation of the radiation image storage panels.

a) Transmittance of phosphor layer

The phosphor film was separated from the radiation image storage panel, and the protective layer was separated from the phosphor film. The phosphor film was then placed in front of a light entrance of the integrating sphere and the amount of light received by the integrating sphere sensor was measured. Separately, no film was placed in front of the light entrance, and the amount of light received by the integrating sphere sensor was measured to give a control light amount. In each of the measurements, the ideal reflecting board comprising the same material as the material forming the inner wall of the integrating sphere was placed in the sample-measuring area. The transmittance was obtained by dividing the amount of light determined in the presence of the phosphor film by the control light amount.

b) Reflectance of the Light-reflecting Layer

The radiation image storage panel from which the phosphor film was separated had the exposed light-reflecting layer. The exposed light-reflecting layer was placed in the sample-measuring position of the integrating sphere and an amount of light received by the integrating sphere sensor was measured. The reflectance was obtained by dividing the measured light amount by the above mentioned control light amount.

(2) Image Quality

The radiation image storage panel was exposed to X rays (0.1 mR, tungsten tube, tube voltage 80 kV) through an MTF chart. The exposed storage panel was then scanned with a semiconductor laser light (wavelength: 660 nm) to apply stimulating energy of 5 J/m$^2$ onto the surface of the storage panel. The stimulated emission released from the storage panel was detected by a light detector (photoelectric multiplier having a spectro-sensitivity of S-5). The received light was converted into a series of electric signals which were then processed to give a radiation image on a display. The sharpness was determined from thus produced radiation image.

Separately, X rays (amount: 0.1 mR) were applied evenly onto the storage panel, and the storage panel was processed in the same manner as above. Then, a Wiener spectrum of graininess was obtained.

The sharpness determined above and the graininess were processed to give a detection quality efficiency (DQE, %) at a space frequency of 1 cycle/mm. The DQE value at 1 mR indicates graininess reflected by quantum mottle.

Independently, the value d was obtained from the amount of phosphor (W) in the phosphor layer and the density (ρ) of the phosphor.

Figure 2:
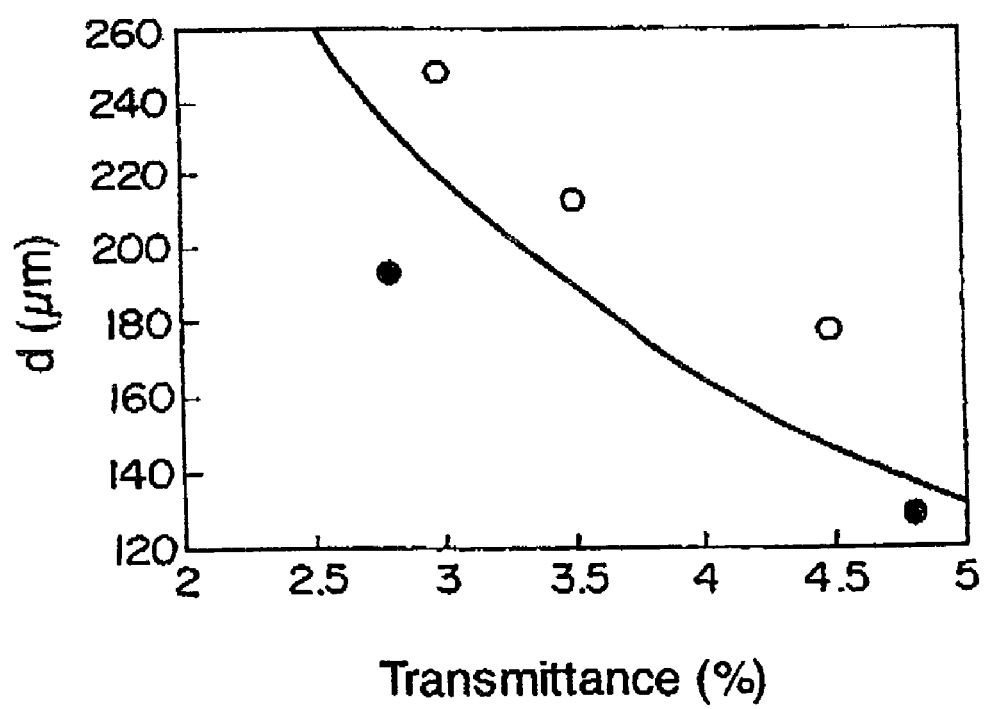
FIG. 2 is a graph illustrating a relationship between the transmittance $T_2$ (%) of the phosphor layer and the value d (μm).
Figure 3:
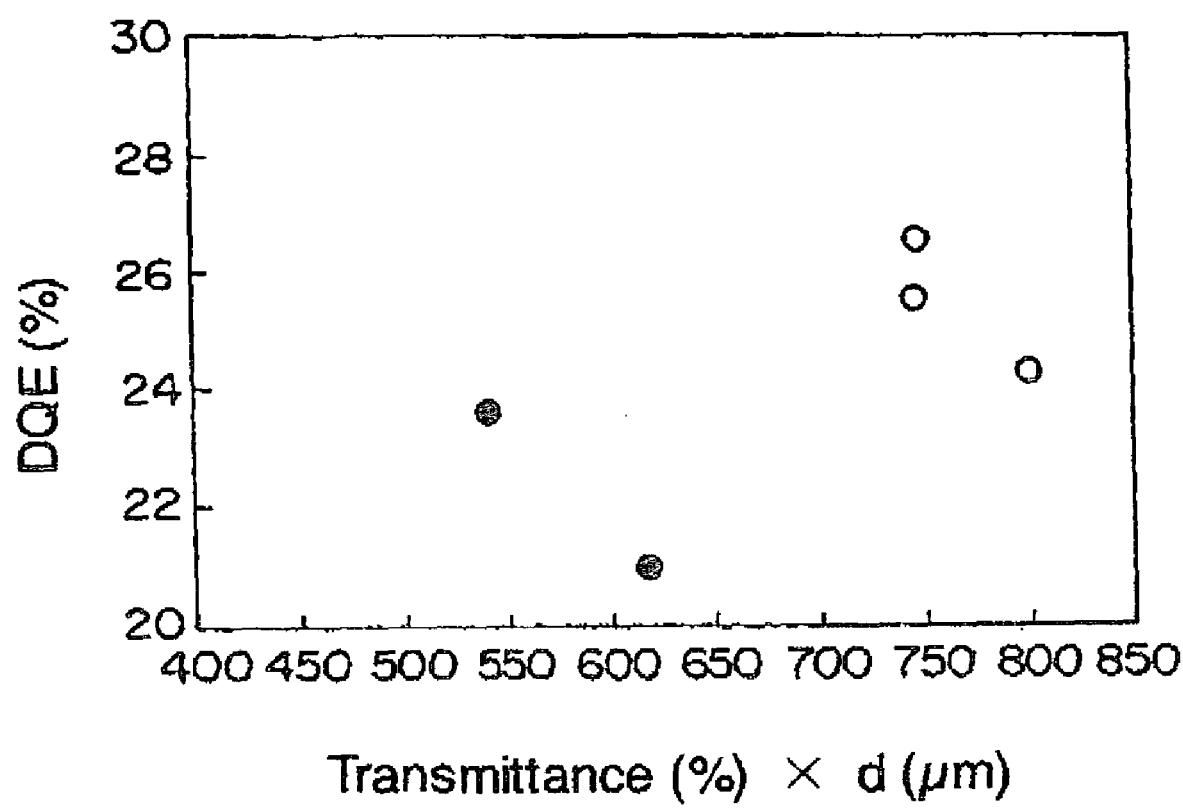
FIG. 3 is a graph illustrating a relationship between the value corresponding to $T_2 \times d$ and DQE (%) showing the level of image quality.

The conditions and results are shown in Tables 1 and 2 and FIGS. 2 and 3.

TABLE 1

| Example | Phosphor particles size (μm) & amount Dm$_1$(wt. %)/ Dm$_2$(wt. %) | Phosphor layer W thickness (mg/cm$^2$) | (μm) | Transmittance T$_1$/T$_2$ | d (μm) |
|---|---|---|---|---|---|
| Ex. 1 | 2.5(30)/7.9(70) | 93 | 250 | 6.3/4.5 | 178 |
| Ex. 2 | 2.5(30)/7.9(70) | 111 | 300 | 5.3/3.5 | 213 |
| Ex. 3 | 2.5(30)/7.9(70) | 130 | 350 | 4.6/3.0 | 249 |
| Com. 1 | 3.9(30)/6.7(70) | 67 | 200 | 6.8/4.8 | 129 |
| Com. 2 | 3.9(30)/6.7(70) | 101 | 300 | 4.4/2.8 | 193 |

Remarks:
T$_1$ is transmittance at a wavelength of 660 nm
T$_2$ is transmittance at a wavelength of 400 nm Remarks:
T$_1$ is a transmittance at a wavelength of 660 nm
T$_2$ is a transmittance at a wavelength of 400 nm

TABLE 2

| Example | $T_1 \times d$ | $T_2 \times d$ | Phosphor density (g/cm³) | Phosphor amount (vol. %) | DQE (0.1 mR) (%) |
|---|---|---|---|---|---|
| Ex. 1 | 1121 | 800 | 3.71 | 71 | 24.3 |
| Ex. 2 | 1129 | 747 | 3.70 | 71 | 25.5 |
| Ex. 3 | 1145 | 747 | 3.69 | 71 | 26.6 |
| Com. 1 | 877 | 618 | 3.35 | 64 | 21.0 |
| Com. 2 | 849 | 541 | 3.35 | 64 | 23.6 |

FIG. 2 is a graph indicating a relationship between the transmittance (%) of the phosphor layer at a wavelength of 400 nm (corresponding to the peak wavelength of the stimulated emission) and the value d (μm). The curve given in the graph indicates the relationship of $T_2 \times d = 660$. The blank circles indicate the relationships of Examples 1 to 3, while the black spots indicate the relationships of Comparison Examples 1 and 2.

FIG. 3 is a graph indicating a relationship between the value of $T_2 \times d$ and DQE (0.1 mR). The blank circles indicate the relationships of Examples 1 to 3, while the black spots indicate the relationships of Comparison Examples 1 and 2.

The results shown in Tables 1 and 2 indicate that the radiation image storage panels according to the invention (Examples 1 to 3) which satisfy the conditions of more than 660 for the values corresponding to $T_1 \times d$ and $T_2 \times d$ and more than 3.4 g/cm³ for the density of the phosphor particles in the phosphor layer give a higher DQE value, as compared with the radiation image storage panels of Comparison Examples 1 and 2 not satisfying the above-mentioned conditions. The higher DQE value means that the graininess reflected by the quantum mottle is better. Moreover, FIG. 2 indicates that $T_2$ and d vary in approximately inverse proportion to each other. FIG. 3 indicates that increase of $T_2 \times d$ gives increase of DQE.

What is claimed is:

1. A radiation image storage panel which comprises a phosphor layer comprising energy-storing phosphor particles and a polymer binder and which satisfies the following conditions:

$$T_1 \times d \geq 660$$

$$T_2 \times d \geq 660$$

$$D \geq 3.4$$

wherein each of $T_1$, $T_2$, d and D has the following meaning;

$T_1$: a transmittance in terms of percentage of the phosphor layer at a peak wavelength of a stimulation spectrum of the energy-storing phosphor particles;

$T_2$: a transmittance in terms of percentage of the phosphor layer at a peak wavelength of a stimulated emission spectrum of the energy-storing phosphor particles;

$d = 10,000 \times W/\rho$ in which W is a weight of the energy-storing phosphor particles in a unit area of the phosphor layer expressed in terms of mg/cm² and ρ is a density of the energy-storing phosphor expressed in terms of g/cm³; and D is a density of the energy-storing phosphor particles contained in the phosphor layer expressed in terms of g/cm³.

2. The radiation image storage panel of claim 1, wherein each of the transmittances of $T_1$ and $T_2$ is 1% or higher.

3. The radiation image storage panel of claim 1, which further comprises a light-reflecting layer on one side of the phosphor layer, the light-reflecting layer having a reflectance of 70% or higher at a peak wavelength of the stimulated emission spectrum.

4. The radiation image storage panel of claim 1, wherein the energy-storing phosphor particles comprises a group of energy-storing phosphor particles having a minimum mean particle diameter $D_{m1}$ in the range of 1.0 to 3.5 μm and a group of energy-storing phosphor particles having a maximum mean particle diameter $D_{m2}$, $D_{m2}/D_{m1}$ being 2.0 or larger.

5. The radiation image storage panel of claim 4, wherein the phosphor layer comprises the group of energy-storing phosphor particles having a minimum mean particle diameter $D_{m1}$ and the group of energy-storing phosphor particles having a maximum mean particle diameter $D_{m2}$ in a weight ratio of 10:90 to 50:10.

6. The radiation image storage panel of claim 5, wherein the ratio is in the range of 20:80 to 38:62.

7. The radiation image storage panel of claim 1, wherein a volume percentage of the energy-storing phosphor particles in the phosphor layer is 65% or higher.

8. The radiation image storage panel of claim 7, wherein the volume percentage is 70% or higher.

* * * * *